United States Patent
Gschwind et al.

(10) Patent No.: US 10,210,163 B2
(45) Date of Patent: *Feb. 19, 2019

(54) LINKER REWRITING TO ELIMINATE TOC POINTER REFERENCES

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 21 days.

This patent is subject to a terminal disclaimer.

(21) Appl. No.: 15/402,156

(22) Filed: Jan. 9, 2017

(65) Prior Publication Data

US 2018/0196801 A1     Jul. 12, 2018

(51) Int. Cl.
*G06F 9/44* (2018.01)
*G06F 17/30* (2006.01)

(52) U.S. Cl.
CPC .... *G06F 17/3007* (2013.01); *G06F 17/30129* (2013.01)

(58) Field of Classification Search
CPC ............ G06F 17/3007; G06F 17/30129
USPC .......................................... 717/162
See application file for complete search history.

(56) References Cited

U.S. PATENT DOCUMENTS

| | | | |
|---|---|---|---|
| 5,375,241 A | 12/1994 | Walsh | |
| 5,764,987 A * | 6/1998 | Eidt | G06F 8/54 717/100 |
| 7,200,843 B2 * | 4/2007 | Shann | G06F 8/54 717/162 |
| 8,434,099 B2 * | 4/2013 | Forin | G06F 9/4411 717/162 |
| 9,218,170 B1 * | 12/2015 | Gschwind | G06F 8/43 |
| 9,250,875 B1 * | 2/2016 | Gschwind | G06F 8/443 |
| 9,384,130 B2 | 7/2016 | Gschwind et al. | |
| 2013/0031535 A1 * | 1/2013 | Ji | G06F 11/3624 717/145 |
| 2018/0196669 A1 * | 7/2018 | Gschwind | G06F 9/30145 |

OTHER PUBLICATIONS

IBM: "A Method for Dynamic Linking and Contextual Extension of Independent Systems", ip.com, IPCOM000020583D, Nov. 28, 2003.

* cited by examiner

*Primary Examiner* — Chameli Das
(74) *Attorney, Agent, or Firm* — Patterson + Sheridan, LLP

(57) ABSTRACT

A method and associated computer program product are disclosed for generating an executable file from an object file comprising a function that references a table of contents (TOC) pointer register. The method comprises identifying, based on at least one first annotation included in the object file, at least one instruction of the function having an eliminable reference to the TOC pointer register, and determining, during a linking of the object file and based on the at least one first annotation, whether to eliminate the eliminable reference.

18 Claims, 3 Drawing Sheets

LINKER REWRITING TO ELIMINATE TOC POINTER REFERENCES

BACKGROUND

Embodiments disclosed herein relate to the field of computer architecture. More specifically, embodiments disclosed herein relate to techniques for eliminating one or more references to a Table of Contents (TOC) register within generated executable files.

SUMMARY

According to one embodiment, a method is disclosed for generating an executable file from an object file comprising a function that references a table of contents (TOC) pointer register. The method comprises identifying, based on at least one first annotation included in the object file, at least one instruction of the function having an eliminable reference to the TOC pointer register, and determining, during a linking of the object file and based on the at least one first annotation, whether to eliminate the eliminable reference.

According to another embodiment, a computer program product is disclosed comprising a computer-readable device having computer-readable program code embodied therewith. The computer-readable program code is executable by one or more computer processors to perform an operation for generating an executable file from an object file comprising a function that references a table of contents (TOC) pointer register. The operation comprises identifying, based on at least one first annotation included in the object file, at least one instruction of the function having an eliminable reference to the TOC pointer register, and determining, during a linking of the object file and based on the at least one first annotation, whether to eliminate the eliminable reference.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
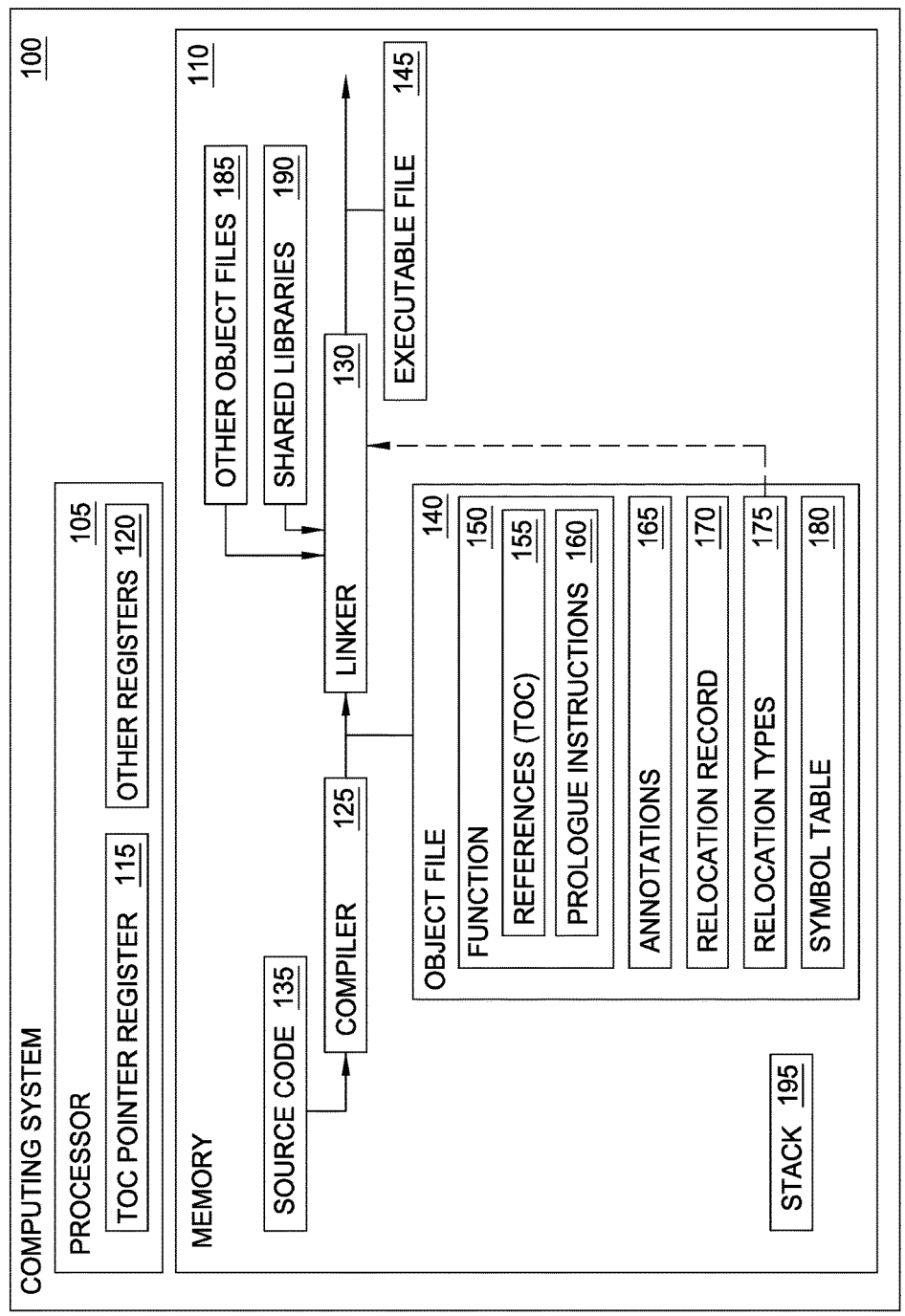
FIG. 1 is a block diagram illustrating an exemplary computing system for generating an executable file with one or more references to a TOC pointer register, according to one or more embodiments disclosed herein.

In computer software, an application binary interface (ABI) describes the low-level interface between an application program and the operating system or between the application program and another application. The ABI covers details such as data type, size, and alignment; the calling conventions which controls how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix® ABI allowing a wide range of programs to run on a variety of Unix and Linux® variants for the Intel x86 architecture) allow an application program from one operating system (OS) supporting that ABI to run without modifications on any other such system, provided that necessary shared libraries are present, and similar prerequisites are fulfilled. Unix is a registered trademark of The Open Group. Linux is the registered trademark of Linus Torvalds in the U.S. and other countries.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

A compiler generally works on a single source file (e.g., a compile unit) at a time to generate object files. The compiler generates object code without knowing the final address or displacement of the code/data. Specifically, the compiler generates object code that will access a TOC for variable values without knowing the final size of the TOC or offsets/addresses of various data sections. Placeholders for this information are left in the object code and updated by the linker. A TOC is a variable address reference table that is utilized, for example in an AIX® environment, to access program variables in a manner that supports shared libraries and is data location independent. AIX is a United States trademark owned by International Business Machines Corporation, and may also be a trademark or registered trademark in other countries.

A similar structure, referred to as a global offset table (GOT), performs a similar function (e.g., indirect and dynamically relocatable access to variables) in a Linux environment. The person of ordinary skill will recognize the applicability of the techniques described herein to other similar data structures, despite any difference in naming. One difference between a TOC and a GOT is that a TOC may contain actual data, where a GOT only contains addresses (pointers) to data. In the Linux PowerPC® 64-bit environment the TOC contains the GOT section plus small data variables. PowerPC is a United States trademark owned by International Business Machines Corporation, and may also be a trademark or registered trademark in other countries.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC pointer register) may therefore be saved and restored for each function call, either by a procedure linkage table (PLT) stub code segment, or by the callee function in conventions where the TOC register is treated as a preserved (i.e., callee-saved) register.

The instruction set of certain processor architectures may not permit a memory address to be referenced as an immediate operand of any instruction. For example, on PowerPC, immediate operands to instructions can occupy 16 bits at most, such that loading a full 64-bit address may require a sequence of up to five (5) instructions. In addition, for code to be considered position-independent, memory addresses cannot appear as immediate operands at all, since this would require modifying an application's (or shared library's) text section on startup. Such a modification may be typically avoided to improve performance and/or security of the application. For this reason, PowerPC code will often use a TOC to hold needed address values in a central place outside the text section. Those addresses held in the TOC can point to global variables, which may reside in another shared library. In order to access the TOC, the address of the TOC is required; in some embodiments, code will compute the address of the TOC once at function startup, and will hold the computed address within a TOC pointer register throughout the execution of the function, so it is available whenever the TOC needs to be accessed to load an address. The TOC pointer register may also be used directly to access local variables or constants which are known to reside in the same shared library at some fixed offset (known at link time) relative to the TOC.

For example, a function that updates a static variable "x" by adding a value to it could be implemented as follows:

TABLE 1

Example function code

| | |
|---|---|
| func: | # Global entry point |
| 0: addis 2,12,.TOC.-0b@ha | # Prologue sequence that initializes the TOC pointer register r2 |
| addi 2,2,.TOC.-0b@l | |
| .localentry func,.-func | # Local entry point used by callers that have already set up r2 |
| addis 10,2,x@toc@ha | # Two-instruction sequence to access "x" relative to r2 |
| lwz 9,x@toc@l(10) | # r10 is used as a temporary to hold one part of the address of "x" |
| add 3,9,3 | # Perform the actual operation (addition) |
| stw 3,x@toc@l(10) | # The second access only needs one instruction since r10 is reused |
| blr | # Function return |

While the code included within Table 1 will technically be correct for a general case, in some circumstances other code sequences for the same operation may be preferable as being more efficient (i.e., using less processor resources). In one example, if the code is not required to be position-independent (e.g., a main executable in many cases), the linker may know the final addresses of the TOC and of variables within the same executable. If those addresses do not require the full 64 bits of the address space (for example, because the executable will end up fully below the 2 GB line), the variables may be accessed using two-instruction sequences that do not require use of the TOC pointer register (e.g., register r2). Thus, the above example function code could be rewritten as shown in Table 2.

TABLE 2

Example function code removing TOC reference

```
func:
0:
    lis 10,x@ha
    lwz 9,x@l(10)
    add 3,9,3
    stw 3,x@l(10)
    blr
```

In the rewritten example of Table 2, the TOC pointer register r2 is now no longer used. Although the same number of instructions are included as in the original code (i.e., following the local entry point shown in Table 1), in certain microprocessor architectures this code sequence may be executed faster since the reference to register r2 is avoided. For example, a reference made to a register that only was computed a short time ago can trigger pipeline hazards that tend to slow down execution. In addition, since the TOC pointer register r2 is now not used at all, it is possible to fully omit the prologue sequence of Table 1 that is used to initialize the r2 register, which further reduces execution time and/or processor resource consumption.

Another scenario in which more efficient code than the original sequence of Table 1 may be used is where the particular processor architecture provides an instruction to allow program counter (PC)-relative accesses. Such instructions would permit the code to access a local variable "x" without use of a TOC pointer register, even if the code must remain position-independent. In this case, one or more additional requirements may also need to be met, e.g., that the local variable "x" is placed within 2 GB of the code itself.

A compiler (or assembly code writer) may be configured to generate optimized code sequences directly, but each sequence will not be generally applicable. For example, if a compiler generates an optimized code sequence based on an assumption that an executable fits within the first 2 GB, but the assumption turns out to be incorrect, the generated code sequence is therefore unusable. Similarly, if a compiler generates an optimized code sequence based on an assumption that an executable will be executed on a processor that has PC-relative instructions, but the assumption turns out to be incorrect because the executable is executed on an older version of the processor that lacks PC-relative instructions, the generated code sequence is unusable. Therefore, compilers typically provide options to generate multiple variants of the code, depending on which assumptions should be made. However, this results in multiple copies of the resulting object files to be generated, which are separately maintained and are usable only under certain circumstances. This tends to make software development processes more cumbersome (e.g., requiring use of an object file library for reuse purposes).

Therefore, it may be beneficial to have the compiler instead generate a single object file including the generic version of the code. As the linker then uses this object file to generate the final executable (or shared library), in some embodiments the linker rewrites the generic code sequence to a specific code sequence where the code sequence is correct for the scenario the linker is currently targeting. Conventional linker rewriting techniques may include (1) modifying the prologue sequence to use a preferable method of initializing the TOC pointer register when creating position-dependent code, and (2) simplifying sequences to load a value from the TOC if the linker knows the total size of the TOC is below a predefined size, such as 64 kB. However, these techniques continue to require use of the TOC pointer register.

Embodiments of the disclosure are generally directed to techniques for linker rewriting of object files in a manner that entirely eliminates use of the TOC pointer register through cooperative operation of the compiler and the linker. According to various embodiments, the compiler generates object files comprising code that is amenable to eliminating references to the TOC pointer register. The code includes suitable annotations that inform the linker about the generated code.

FIG. 1 is a block diagram illustrating an exemplary computing system 100 for generating an executable file with reduced save and restore instructions for designated call-clobbered registers, according to one or more embodiments disclosed herein. The computing system 100 comprises a processor 105 and a memory 110.

The processor 105 generally includes any processing element capable of performing various functions described herein. While depicted as a single element within the computing system 100, processor 105 is intended to represent a single processor, multiple processors, a processor or processors having multiple cores, as well as combinations thereof. In one embodiment, processor 105 represents a central processing unit (CPU) of the computing system 100. Memory 110 may include a variety of computer-readable media selected for relative performance or other capabilities: volatile and/or non-volatile media, removable and/or non-removable media, etc. Memory 110 may include cache, random access memory (RAM), storage, etc. Storage included in memory 110 typically provides a non-volatile memory for the computing system 100, and may include one or more different storage elements such as Flash memory, a hard disk drive, a solid state drive, an optical storage device, and/or a magnetic storage device.

The processor 105 comprises a plurality of hardware-based registers such as a TOC pointer register 115 and other registers 120. As discussed above, the TOC pointer register 115 stores a pointer to a variable address reference table that is utilized to access program variables in a manner that supports shared libraries and is data location independent. In various embodiments, references to the TOC pointer register 115 are included within an object file 140 but may be eliminated by the linker 130 when generating an executable file 145. The other registers 120 may comprise one or more general-purpose and/or special-purpose registers of the processor 105. In some embodiments, at least one of the other registers 120 stores a partial result of an address computation that uses the TOC pointer register 115.

Memory 110 includes a compiler 125 configured to generate an object file 140 from source code 135. The object file 140 comprises one or more functions 150 and is stored in memory 110 for execution by the processor 105. The object file 140 may alternately be generated by a compiler external to the computing system 100. The function 150 includes one or more references 155 to the TOC pointer register 115, and may further include one or more prologue instructions 160 that are configured to initialize the TOC pointer register 115. The one or more references 155 to the TOC pointer register 115 may include one or more eliminable references and/or one or more non-eliminable references, as will be discussed below.

Memory 110 further includes a linker 130 configured to link the object file 140 with one or more other object files 185 and/or shared libraries 190 to generate a single executable file 145. The shared libraries 190 comprise one or more functions that are external to the object file 140 and that may be called during execution of the object file 140 via external function calls. In some embodiments, the compiler 125 and linker 130 cooperate to eliminate one or more eliminable references 155 to the TOC pointer register 115 that are included within the object file 140. To achieve this, the compiler 125 generates the object file 140 comprising code that is amenable to eliminating references 155 to the TOC pointer register 115. The object file 140 further comprises suitable annotations 165 that inform the linker 130 about the generated code, so that the linker 130 is configured to eliminate one or more eliminable references 155.

Stack 195 comprises a data structure within memory 110 that stores information related to functions 150 that are active during the execution of the object file 140. Each function 150 included in the object file 140 has a respective stack frame within stack 195 when active during execution.

In some embodiments, annotations 165 within the object file 140 are included within one or more relocation records 170, one or more relocation types 175, and one or more symbol tables 180, which are suitable for communicating with the linker 130. Relocation records 170 are generally instructions to the linker 130 to replace a "placeholder" that is left in the object file 140 with some or all of the actual address of a TOC slot storing an address for a variable, or the offset of the variable relative to the TOC. Such a relocation record 170 typically includes (1) the location of the "placeholder" to be replaced, (2) the name of the variable symbol, and (3) a relocation type 175 indicating which action of a plurality of predefined actions that the linker 130 is to perform.

In some embodiments, the symbol table 180 is generated by the compiler 125 and comprises a data structure that associates each identifier (i.e., function and variable names) in a program's source code 135 with information relating to its declaration or appearance in the source code 135, such as type, scope level, and/or location. In some embodiments, the compiler 125 is configured to set a bit in the entry of the symbol table 180 associated with the function 150 to indicate whether the TOC pointer register 115 is required by the function 150.

In order to generate an object file 140 comprising code that is amenable to eliminating references 155 to the TOC pointer register 115, the compiler 125 generally performs the following:

(1) annotating all instructions that are amenable to having TOC pointer register references 155 eliminated via linker rewriting;
(2) marking any function 150 that contains no use of the TOC pointer register 115 except for those instructions that have been annotated in step (1); and (3) marking all prologue instructions 160 that form part of the prologue to set up the TOC pointer register 115.

In turn, the linker 130 uses the information provided in the object file 140 to:

(4) determine whether elimination of any references 155 is feasible for the current link process;

(5) rewrite all uses of the TOC pointer register 115 that have been annotated by the compiler 125 in step (1) to thereby eliminate use of the TOC pointer register 115; and (6) for every function 150 marked during step (2), eliminate all prologue instructions 160 that were marked during step (3).

Figure 2:
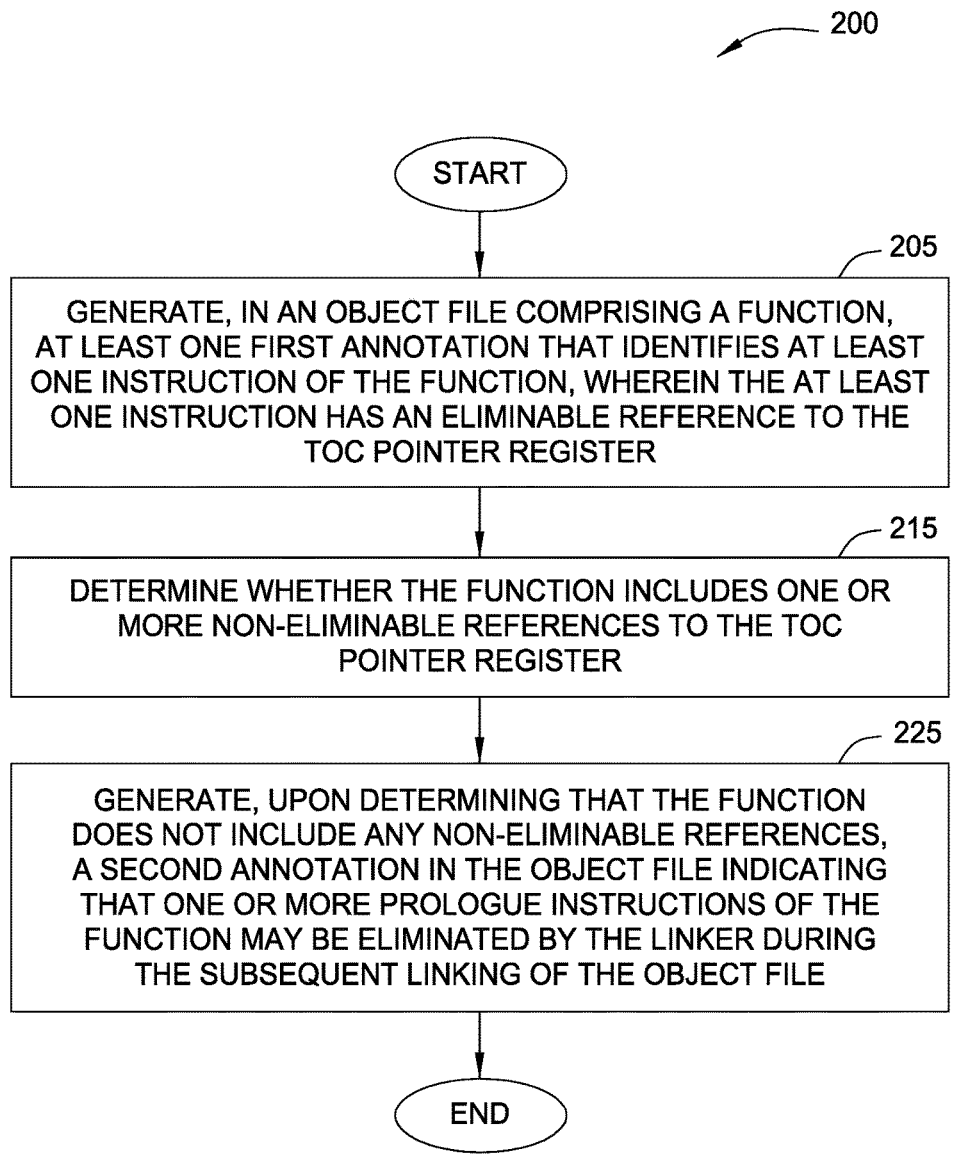
FIG. 2 is a flow chart illustrating a method for generating an object file for subsequent linking by a linker, according to one or more embodiments disclosed herein.

Now referring also to FIG. 2, method 200 begins at block 205, where the compiler 125 generates at least one first annotation 165 that identifies at least one instruction of the function 150. The at least one instruction includes an eliminable reference 155 to the TOC pointer register 115. In some embodiments, the annotation 165 is included within a special relocation record 170. For example, object code that accesses a variable with an address stored in a slot of the TOC, or having an offset relative to the TOC, typically includes a relocation record 170. The relocation type 175 included in the relocation record 170 indicates which action of a plurality of predefined actions that the linker 130 is to perform. In some embodiments, the plurality of predefined actions includes one or more of (1) determining an offset of the variable relative to the TOC pointer register 115, (2) allocating a slot of the TOC pointer register 115 with an address of the variable and determining the offset, and (3) extracting a portion of a resulting address or offset.

In addition to the placeholder that is referred to by the relocation record 170, the object code generated by the compiler 125 may also use the TOC pointer register 115. For example, Table 3 includes a portion of the code sequence of Table 1 that references the TOC pointer register 115.

TABLE 3

Example function code referencing TOC pointer register addis 10,2,x@toc@ha
lwz 9,x@toc@l(10)

Within Table 3, the "addis" (i.e., add immediate shifted) instruction uses the TOC pointer register (i.e., "2"), and also includes a relocation record that instructs the linker 130 to fill in the placeholder (i.e., a displacement field of the instruction) with the high 16-bit portion of the offset of a variable "x", relative to the TOC pointer value (i.e., "x@toc@ha"). The "lwz" (i.e., load word and zero) instruction does not itself use the TOC pointer register 115, but the instruction includes a relocation record that instructs the linker 130 to fill in the placeholder with the low 16-bit portion of the offset of the variable "x" relative to the TOC pointer value (i.e., "x@toc@l(10)"). The effect of the combination of the addis and lwz instructions is to combine the low 16-bit portion and the high 16-bit portion of the relative offset of the variable "x" (resulting in the full TOC offset value, assuming that the TOC offset value fits into 32 bits), and to add the TOC pointer value found in the TOC pointer register 115 to result in the absolute address of the variable "x", which is then used to access the variable. The combination of the addis and lwz instructions employs one other register 120 (i.e., register r10, shown as "10"). The register r10 stores a partial address, more specifically a sum of the TOC pointer value plus the high 16-bit portion of the relative offset of the variable "x".

In some embodiments, the compiler 125 performs an analysis to determine whether the semantics of the generated object code will be preserved in the case where the linker 130 rewrites all annotated instructions. In one embodiment, the compiler 125 performs a data flow analysis to ensure that (A) if any annotated instruction stores a partial result of a TOC-relative address computation in a register, every use of that stored partial result occurs within an annotated instruction, and (B) if any annotated instruction uses a register value (apart from the TOC pointer register 115) to compute a TOC-relative address, that register value was computed within an annotated instruction.

In one embodiment, the compiler 125 ensures that all of the generated object code that refers to the TOC pointer register 115 using any relocation type 175 will be preserved, in which case the linker 130 may consider any annotated instruction to be suitable for rewriting. In another implementation, only a portion of the generated code that refers to the TOC pointer register 115 will be preserved, and the compiler 125 uses a plurality of different relocation types 175 to distinguish instructions that the linker 130 considers as annotated for rewriting from other instructions that will not be written despite referring to the TOC pointer register 115.

At block 215 of method 200, the compiler 125 determines whether the function 150 includes one or more non-eliminable references 155 to the TOC pointer register 115. At block 225, upon determining that the function does not include any non-eliminable references 155, the compiler 125 generates a second annotation 165 in the object file 140 indicating that one or more prologue instructions 160 of the function 150 may be eliminated by the linker 130 during subsequent linking of the object file 140. In some embodiments, the second annotation 165 comprises a bit in the entry of the symbol table 180 associated with the function 150 that indicates whether the TOC pointer register 115 is required by the function 150. Method 200 ends following completion of block 225.

Figure 3:
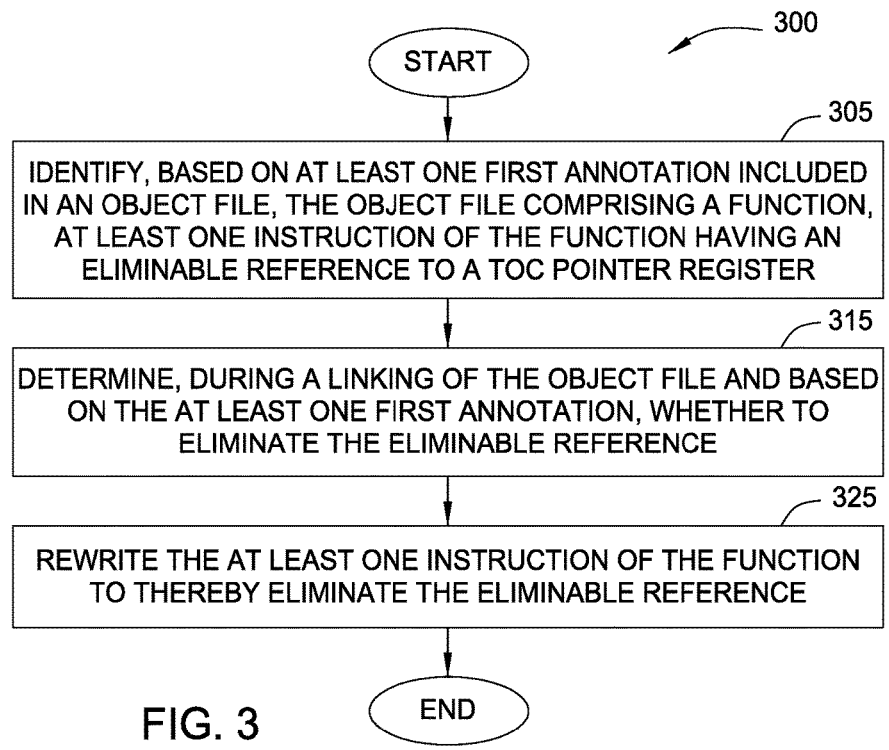
FIG. 3 is a flow chart illustrating a method for generating an executable file from an object file, according to one or more embodiments disclosed herein.
Figure 4:
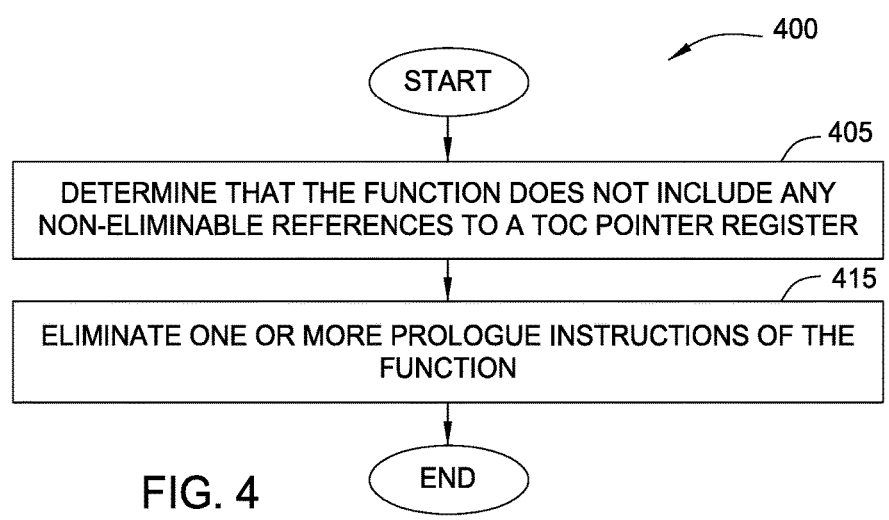
FIG. 4 is a flow chart illustrating a method for eliminating one or more prologue instructions for a function, according to one or more embodiments disclosed herein.

Now referring to FIGS. 1 and 3, method 300 begins at block 305, where the linker 130 identifies, based on at least one first annotation 165 included in an object file 140, at least one instruction of the function 150 having an eliminable reference 155 to a TOC pointer register 115. At block 315, the linker 130 determines whether to eliminate the eliminable reference 155 based on the at least one first annotation 165. At block 325, the linker 130 rewrites the at least one instruction of the function to thereby eliminate the eliminable reference 155. Method 300 ends following completion of block 325.

Table 4 includes an example of the linker 130 rewriting the code included in Table 3.

TABLE 4

Example linker-rewritten function code lis 10,x@ha
lwz 9,x@l(10)

The first instruction ("lis") loads the high 16-bit portion of the address of "x", and the second instruction ("lwz") combines the loaded value with the low 16-bit part of the address of "x", resulting in the full absolute address of "x", which is then used to access the variable. Because the temporary register (r10; "10") now stores a different value than the value stored during execution of the non-rewritten program (i.e., as shown in Table 3), rewriting only a single instruction of the first and second instructions would thus incompatibly change the semantics of the program. In other words, only when the linker 130 rewrites both the first and second instruction at the same time will the semantics of the program remain unchanged, and the code transformation will be valid.

The linker 130 is generally unable to perform the dataflow analysis required to validate that the value stored in register 10 when executing the "lwz" instruction is in fact the same value computed by the "addis" instruction, and to validate that the value computed by the "addis" instruction is only used by the "lwz" instruction. As a result, the linker 130 is generally unable to determine whether that the code transformation is valid, and relies upon compiler 125 to ensure the validity of the code transformation. In some embodiments, the code may include multiple uses of the intermediate value (such as in Table 1), and the code transformation may still be valid in the case where the linker 130 rewrites all uses of the intermediate value.

Method 400 may generally be performed in conjunction with method 300. Method 400 begins at block 405, where the linker 130 determines that the function 150 does not include any non-eliminable references 155 to a TOC pointer register 115. In some embodiments, when all of the instructions within a function 150 that use the TOC pointer register 115 have been rewritten by the linker 130, the linker 130 eliminates prologue instructions 160 included in the prologue of the function 150 that are configured to initialize the TOC pointer register 115. To perform this operation, the linker 130 should know that the function 150 does not contain any other use of the TOC pointer register 115, except for the annotated instructions that are marked for rewriting, as the annotated instructions will no longer refer to the TOC pointer register 115 after the rewrite. In some embodiments, the linker 130 is informed of this condition by the compiler 125. The compiler 125 has this information available, since the compiler 125 knows the location of object code that uses the TOC pointer register 115. The compiler 125 may further know one or more locations where the TOC pointer register 115 may be implicitly required to be valid, e.g., during a subroutine call when mandated by the platform Application Binary Interface. In these embodiments, the compiler 125 passes this information by setting a flag bit in a predefined data structure in the object file 140 that is associated with the function 150. In some implementations, the flag bit is a bit in the symbol table 180 entry associated with the function symbol.

However, in other embodiments, the linker 130 determines the condition without being informed by the compiler 125. For example, this may be the case where the instruction set and object layout permit the linker 130 to perform a full scan of all code instructions that form part of a function 150, and to determine whether any of those code instructions refer to the TOC pointer register 115 either explicitly or implicitly.

At block 415, the linker 130 eliminates one or more prologue instructions 160 of the function 150. The prologue instructions 160 are configured to initialize the TOC pointer register 115. When the linker 130 has determined that the prologue instructions 160 setting up the TOC pointer register 115 may be eliminated, the linker 130 proceeds to eliminate the compiler-marked prologue instructions 160. In one embodiment, the prologue instructions 160 use one or several special relocation types 175 that are not used by other instructions of the function 150, such that the linker may eliminate any instruction in the current function 150 that use the special relocation types 175. In another embodiment, the compiler 125 uses multiple entry points marked in the symbol table 180 associated with the function symbol. In such a case, the prologue of the function 150 can be defined as all code between certain of those entry points, such as between the global entry point and the local entry point in the PowerPC ELFv2 ABI (e.g., as shown in Table 1).

In some embodiments, the linker 130 eliminates prologue instructions 160 by replacing each prologue instruction 160 with a no-op instruction. In other embodiments, upon determining that the prologue instructions 160 to be eliminated are placed as the very first instructions immediately following a function entry point, the linker 130 modifies the entry point information to point directly to the first instructions after the prologue instruction 160. In some cases, modifying the entry point information can result in multiple entry points (which previously pointed to different addresses) to point to a same address, such that the function 150 may be subsequently treated as a single-entry-point routine. Method 400 ends following completion of block 415.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of generating an executable file from an object file comprising a function that references a table of contents (TOC) pointer register, the method comprising:
    identifying, based on at least one first annotation included in the object file within a relocation type information of a relocation record of the object file that specifies one relocation type of a plurality of predefined relocation types in which each relocation type indicates a respective action to be performed, at least one instruction of the function having an eliminable reference to the TOC pointer register;

determining, during a linking of the object file and based on the at least one first annotation, whether to eliminate the eliminable reference; and eliminating, upon determining that the function does not include any non-eliminable references to the TOC pointer register, any prologue instructions from the function that are configured to initialize the TOC pointer register.

2. The method of claim 1, further comprising:
rewriting the at least one instruction of the function to thereby eliminate the eliminable reference.

3. The method of claim 1, wherein determining that the function does not include any non-eliminable references includes determining that the object file does not include a predefined second annotation.

4. The method of claim 1, further comprising:
modifying, upon determining that the function does not include any non-eliminable references to the TOC pointer register, an entry point of the function.

5. The method of claim 4, wherein the function is a single-entry point function after modifying an entry point of the function.

6. The method of claim 1, wherein the plurality of predefined relocation types indicates at least one of the following actions to be performed:
determining an offset of a variable relative to the TOC pointer register;
allocating a slot of the TOC pointer register with an address of the variable and determining the offset; and
extracting a portion of a resulting address or offset.

7. The method of claim 1, wherein the plurality of predefined relocation types comprises:
a first relocation type indicating to rewrite the instruction to thereby eliminate the eliminable reference, and
a second relocation type indicating to not rewrite the instruction.

8. The method of claim 1, wherein the at least one instruction comprises:
a first instruction that comprises storing, in a register, a partial result of an address computation that uses the TOC pointer register, and
at least one second instruction that references the partial result,
wherein the at least one first annotation includes respective annotations for the first instruction and the at least one second instruction.

9. The method of claim 1, wherein the prologue instructions are eliminated from between a global entry point and a local entry point of the function by modifying the global entry point for the function to point after the prologue instructions in a sequence of execution for the function.

10. A computer program product comprising a computer-readable storage device having computer-readable program code embodied therewith, the computer-readable program code executable by one or more computer processors to perform an operation for generating an executable file from an object file comprising a function that references a table of contents (TOC) pointer register, the operation comprising:
identifying, based on at least one first annotation included in the object file within a relocation type information of a relocation record of the object file that specifies one relocation type of a plurality of predefined relocation types in which each relocation type indicates a respective action to be performed, at least one instruction of the function having an eliminable reference to the TOC pointer register;

determining, during a linking of the object file and based on the at least one first annotation, whether to eliminate the eliminable reference; and eliminating, upon determining that the function does not include any non-eliminable references to the TOC pointer register, any prologue instructions from the function that are configured to initialize the TOC pointer register.

11. The computer program product of claim 10, the operation further comprising:
rewriting the at least one instruction of the function to thereby eliminate the eliminable reference.

12. The computer program product of claim 10, wherein determining that the function does not include any non-eliminable references includes determining that the object file does not include a predefined second annotation.

13. The computer program product of claim 10, the operation further comprising:
modifying, upon determining that the function does not include any non-eliminable references to the TOC pointer register, an entry point of the function.

14. The computer program product of claim 13, wherein the function is a single-entry point function after modifying an entry point of the function.

15. The computer program product of claim 10, wherein the plurality of predefined relocation types indicates at least one of the following actions to be performed:
determining an offset of a variable relative to the TOC pointer register;
allocating a slot of the TOC pointer register with an address of the variable and determining the offset; and
extracting a portion of a resulting address or offset.

16. The computer program product of claim 10, wherein the plurality of predefined relocation types comprises:
a first relocation type indicating to rewrite the instruction to thereby eliminate the eliminable reference, and
a second relocation type indicating to not rewrite the instruction.

17. The computer program product of claim 10, wherein the at least one instruction comprises:
a first instruction that comprises storing, in a register, a partial result of an address computation that uses the TOC pointer register, and
at least one second instruction that references the partial result,
wherein the at least one first annotation includes respective annotations for the first instruction and the at least one second instruction.

18. The computer program product of claim 10, wherein the prologue instructions are eliminated from between a global entry point and a local entry point of the function by modifying the global entry point for the function to point after the prologue instructions in a sequence of execution for the function.

* * * * *